(12) United States Patent
Matsunobu (10) Patent No.: US 10,862,361 B2
(45) Date of Patent: Dec. 8, 2020

(54) STATOR AND ROTATING ELECTRIC MACHINE

(71) Applicant: Hitachi Automotive Systems, Ltd., Hitachinaka (JP)

(72) Inventor: Yutaka Matsunobu, Hitachinaka (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 0 days.

(21) Appl. No.: 15/758,467

(22) PCT Filed: Jul. 28, 2016

(86) PCT No.: PCT/JP2016/072097
§ 371 (c)(1),
(2) Date: Mar. 8, 2018

(87) PCT Pub. No.: WO2017/043207
PCT Pub. Date: Mar. 16, 2017

(65) Prior Publication Data
US 2018/0248431 A1    Aug. 30, 2018

(30) Foreign Application Priority Data
Sep. 11, 2015  (JP) .................. 2015-179053

(51) Int. Cl.
*H02K 3/18* (2006.01)
*H02K 3/52* (2006.01)
(Continued)

(52) U.S. Cl.
CPC .......... *H02K 3/18* (2013.01); *H02K 1/24* (2013.01); *H02K 3/12* (2013.01); *H02K 3/50* (2013.01);
(Continued)

(58) Field of Classification Search
CPC .......... H02K 1/16; H02K 15/085; H02K 3/12; H02K 3/28; H02K 1/24; H02K 3/50; H02K 3/52; H02K 3/46; H02K 3/168
See application file for complete search history.

(56) References Cited

U.S. PATENT DOCUMENTS 6,914,356 B2 * 7/2005 Yamamura .............. H02K 3/50
310/71
10,097,069 B2 * 10/2018 Egami .................... H02K 3/522
(Continued)

FOREIGN PATENT DOCUMENTS

DE    10 2011 078 026 A1    12/2012
EP     2 063 516 A2           5/2009
(Continued)

OTHER PUBLICATIONS

JP-2009131025-A machine translation on Jun. 23, 2019.*
(Continued)

*Primary Examiner* — Tran N Nguyen
*Assistant Examiner* — Leda T Pham
(74) *Attorney, Agent, or Firm* — Foley & Lardner LLP (57) ABSTRACT

A stator includes: multi-phase stator coils each having a salient pole concentrated winding; a stator iron core formed with a plurality of teeth around which the multi-phase stator coils are wound; and a plurality of connection rings configured to connect each of the multi-phase stator coils, wherein a winding end position of each of the multi-phase stator coils is disposed closest to the corresponding connection ring among the plurality of connection rings.

11 Claims, 9 Drawing Sheets

(51) Int. Cl.
  *H02K 3/50* (2006.01)
  *H02K 1/24* (2006.01)
  *H02K 3/12* (2006.01)
(52) U.S. Cl.
  CPC .............. *H02K 3/52* (2013.01); *H02K 3/522* (2013.01); *H02K 2203/09* (2013.01); *Y02T 10/64* (2013.01)

(56) References Cited

U.S. PATENT DOCUMENTS

| | | | | |
|---|---|---|---|---|
| 2007/0252447 | A1* | 11/2007 | Ionel | H02K 1/148 310/44 |
| 2008/0251909 | A1 | 10/2008 | Tokuyama et al. | |
| 2008/0265701 | A1* | 10/2008 | Ueda | H02K 3/522 310/71 |
| 2009/0140595 | A1* | 6/2009 | Naganawa | H02K 3/522 310/201 |
| 2009/0179725 | A1 | 7/2009 | Asano | |

FOREIGN PATENT DOCUMENTS

| | | | |
|---|---|---|---|
| JP | 2007-180058 A | 7/2007 | |
| JP | 2008-278555 A | 11/2008 | |
| JP | 2009-131025 A | 6/2009 | |
| JP | 2009131025 A * | 6/2009 | ............. H02K 3/522 |
| JP | 2013-236455 A | 11/2013 | |

OTHER PUBLICATIONS

International Search Report with English translation thereof and Written Opinion issued in corresponding application No. PCT/JP2016/072097 dated Nov. 15, 2016.
Office Action issued in corresponding Chinese Patent Application No. 201680052570.2 dated Apr. 24, 2019 with English translation.
Extended European Search Report issued in corresponding European Application No. 16844071.7 dated Apr. 1, 2019.

* cited by examiner

| WINDING PATTERN | FIRST AND SECOND EMBODIMENTS (THREE TYPES) | CONVENTIONAL EXAMPLE (ONE TYPE) |
|---|---|---|
| SPACE FACTOR | ◎ | ○ |
| MECHANICAL STRENGTH | ◎ | △ |
| COMPREHENSIVE EVALUATION | ◎ | △ |

STATOR AND ROTATING ELECTRIC MACHINE

TECHNICAL FIELD

The present invention relates to a stator and a rotating electric machine.

BACKGROUND ART

In the form of a stator winding, there are concentrated winding in which the coils are formed by concentrating and winding strands for each tooth, and distributed winding in which strands are wound across a plurality of slots and coils having different phases or in-phase phases overlap at a coil end. In the concentrated winding, the coil end can be made small as compared with the distributed winding, which is effective for downsizing and high efficiency of the rotating electric machine. Furthermore, since winding is performed in a concentrated manner on one tooth, it is easier to wind up than the distributed winding, and a coil space factor in the stator slot is also improved.

Generally, there is one type of winding pattern of a concentrated winding coil, and PTL 1 shows a case where there is only one type of winding pattern (see PTL 1).

CITATION LIST

Patent Literature

PTL 1: JP 2009-131025 A

SUMMARY OF THE INVENTION

Technical Problem

In a case where there is one type of winding pattern like a stator described in PTL 1, winding end positions of the U phase, V phase, and W phase concentrated winding coils are the same, so that wiring must be made from the same winding end position to the U phase, V phase, and W phase connection rings. Since the positions of the stator radial positions of the connection rings of the respective phases are different from each other, the length of the wiring from the winding end position to the connection ring varies depending on the phase. If the wiring from the winding end position to the connection ring becomes long, disconnection of the wire may easily occur due to vibration or the like.

Solution to Problem (1) A stator according to claim 1 includes multi-phase stator coils each having a salient pole concentrated winding, a stator iron core formed with a plurality of teeth around which the multi-phase stator coils are wound, and a plurality of connection rings configured to connect each of the multi-phase stator coils, wherein a winding end position of each of the multi-phase stator coils is disposed closest to the corresponding connection ring among the plurality of connection rings.

(2) A stator according to claim 5 includes multi-phase stator coils each having a salient pole concentrated winding, a stator iron core formed with a plurality of teeth around which the multi-phase stator coils are wound, and a plurality of connection rings configured to connect each of the multi-phase stator coils, wherein each of the plurality of connection rings has a different diameter, and a winding end position of each of the multi-phase stator coils exists at three or more different positions in a radial direction.

(3) A rotating electric machine according to claim 7 includes the stator according to any one of claims 1 to 6, and a rotor arranged rotatably via a predetermined gap with respect to a stator iron core.

Advantageous Effects of Invention

According to the present invention, disconnection can be prevented.

DESCRIPTION OF EMBODIMENTS

An embodiment of the present invention will be described below with reference to the drawings.

In the following description, as an example of the rotating electric machine, an electric motor used in an electric vehicle and a hybrid electric vehicle will be described as an example; however, the rotating electric machine of the present invention is not limited to driving an electric vehicle or a hybrid vehicle.

First Embodiment

Figure 1:
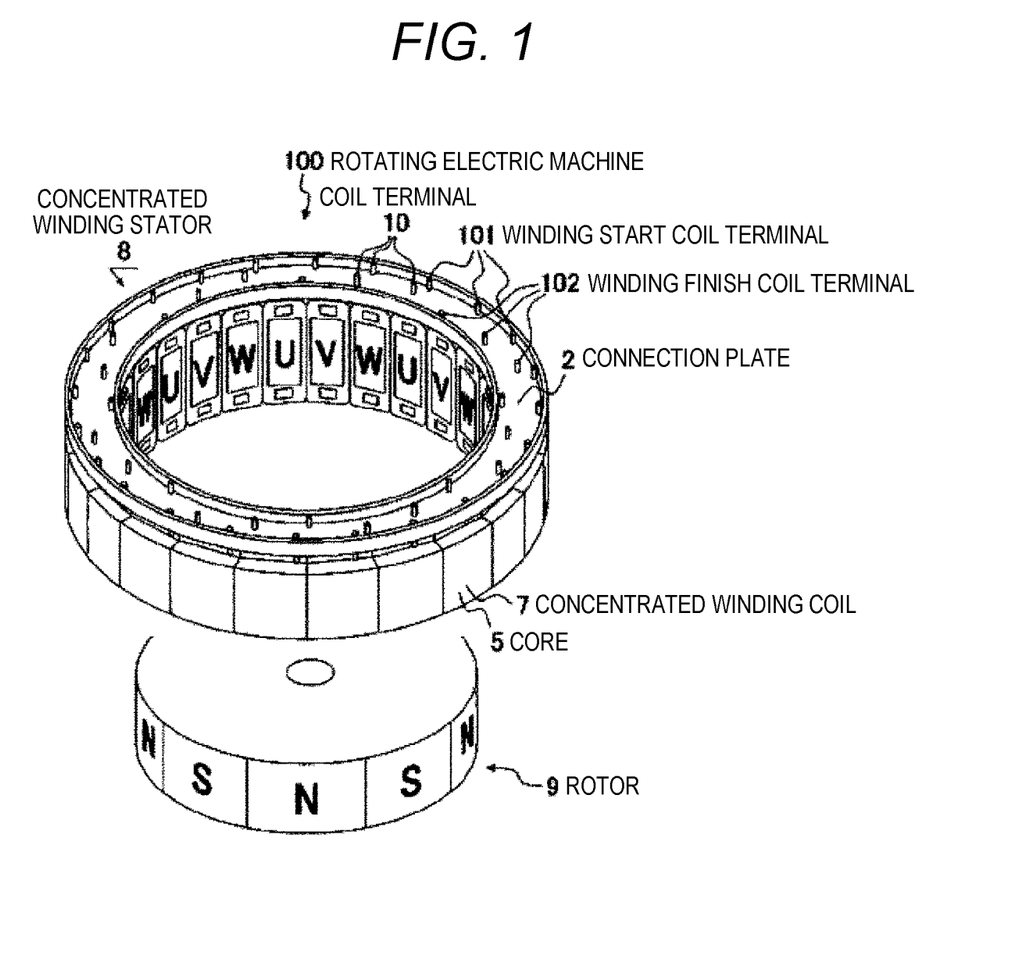
FIG. 1 is a perspective view of a rotating electric machine as an embodiment of the present invention.
Figure 2:
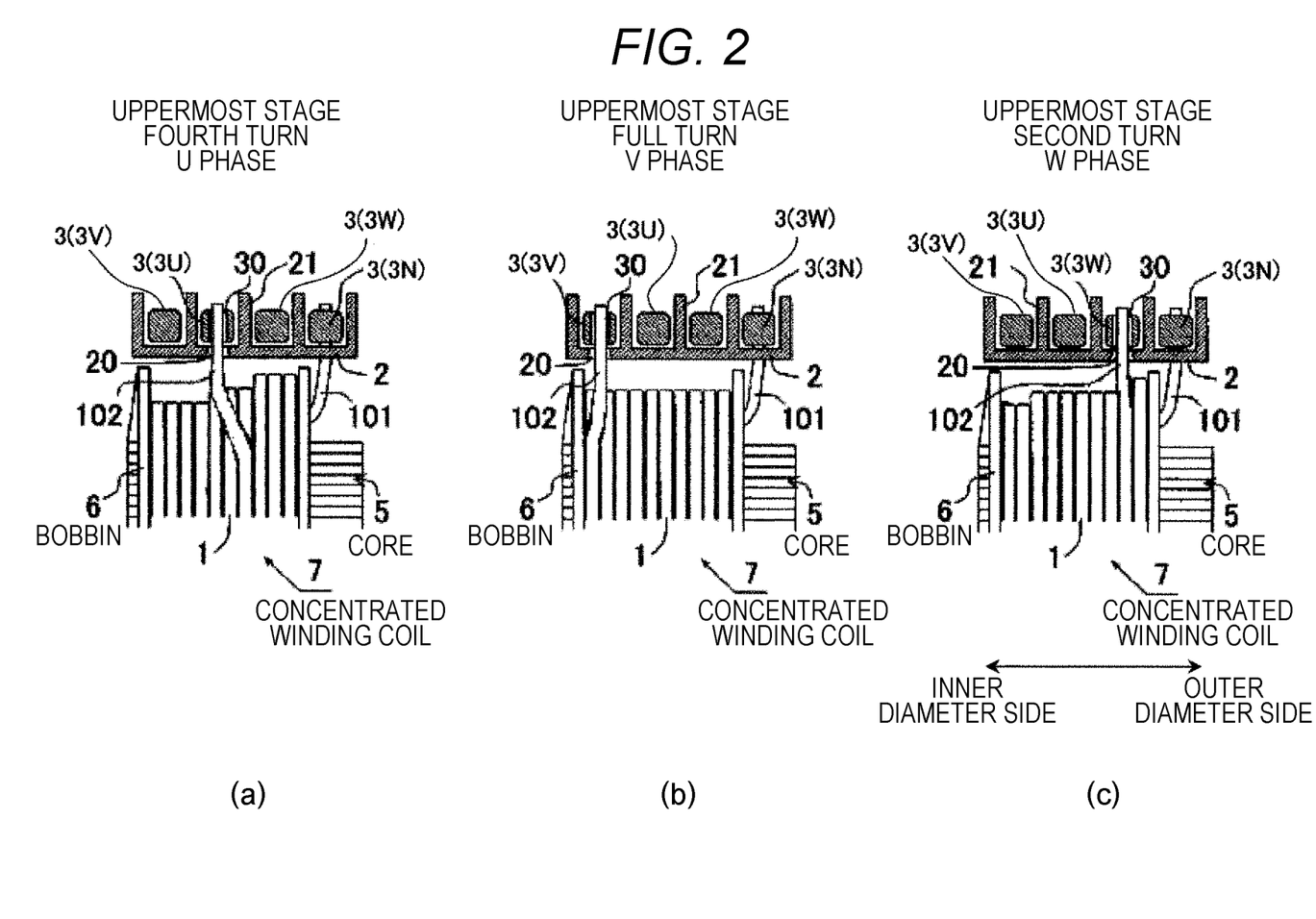
FIG. 2 is a cross-sectional view of a connection portion of a concentrated winding coil of a first embodiment, in which (a) shows a state where a U phase is connected, (b) shows a state where a V phase is connected, and (c) shows a state where a W phase is connected.
Figure 3:
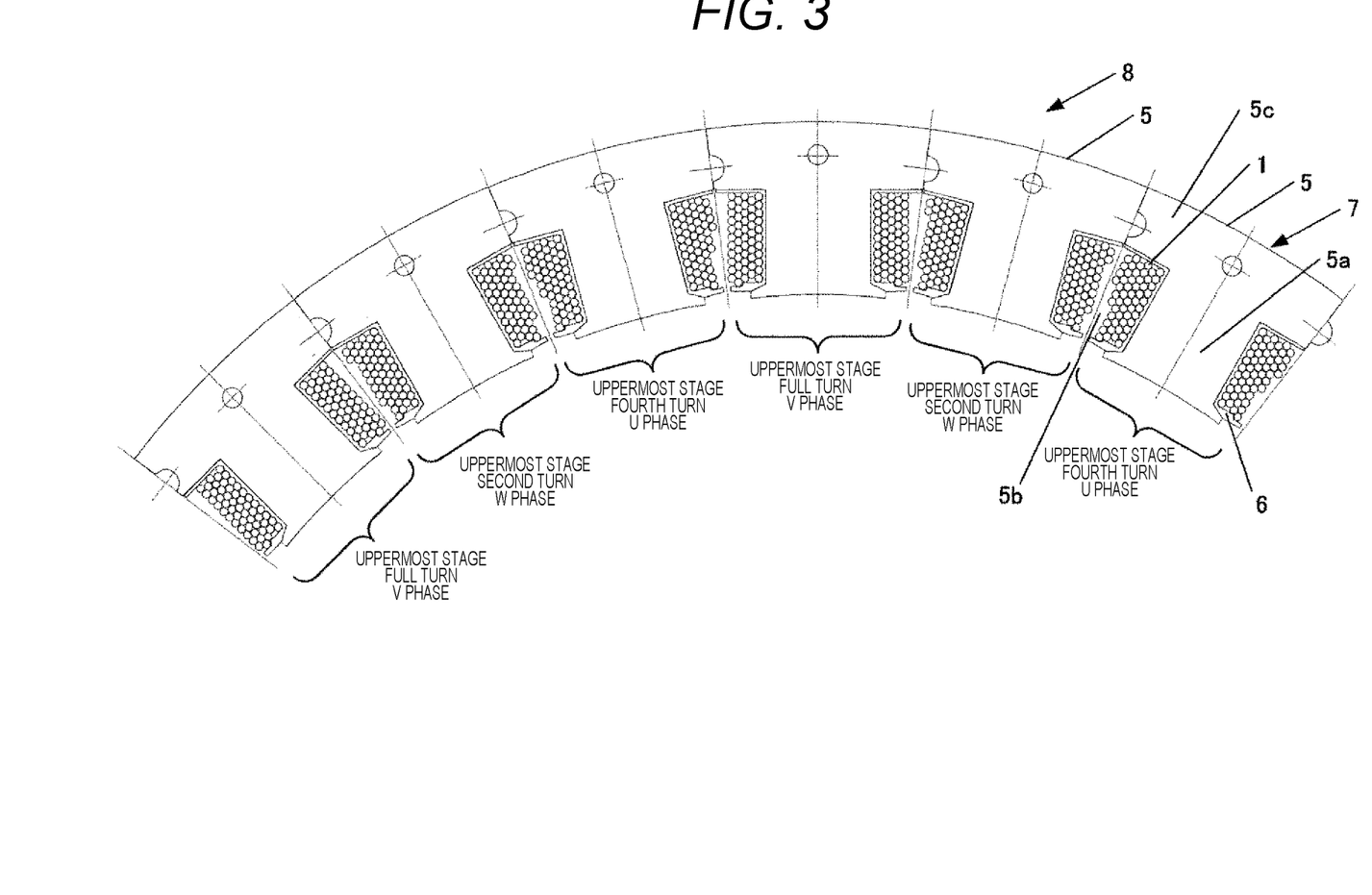
FIG. 3 is a view showing a winding pattern of each phase of the concentrated winding coil of the first embodiment.

FIG. 1 is a perspective view of a rotating electric machine as an embodiment of the present invention. FIG. 2 is a cross-sectional view of the connection portion of the concentrated winding coil. FIG. 3 is a view showing a winding pattern of each phase of the concentrated winding coil.

As shown in FIG. 1, the rotating electric machine 100 includes a concentrated winding stator 8 and a rotor 9 that are arranged coaxially, and in the rotor 9, permanent magnets of N pole and S pole are alternately provided on the side face of the core. The rotor 9 is rotatably disposed with respect to the concentrated winding stator 8 via a predetermined gap.

The concentrated winding stator 8 includes a plurality of cores 5 having a split core structure, and a concentrated winding coil 7 formed by winding an insulating coated conducting wire 1 (see FIG. 2) is provided on the teeth 5a (see FIG. 3) of each core 5. An annular connection plate 2 is disposed on the end face in the axial direction of the core 5, and a coil end is formed. A plurality of through holes 20 (see FIG. 2) are opened in the connection plate 2, and a coil terminal 10 of the concentrated winding coil 7 is inserted. In the present embodiment, the number of the concentrated winding coils 7 is 24, and the U phase, the V phase, and the W phase concentrated winding coils 7 are repeatedly arranged eight times.

As shown in FIG. 3, each of the cores 5 of the concentrated winding coil 7 has one tooth 5a and is formed into a T shape in plan view so as to define one slot 5b between the pair of cores 5 adjacent to each other in a circumferential direction. A plurality of slots 5b aligned in the circumferential direction are formed by assembling the cores 5 in an annular shape. In the following description, for convenience, the concentrated winding coil 7 may be simply referred to as a coil.

The concentrated winding coil 7 of the present embodiment is a stator coil with salient pole concentrated winding. Since there are two coil terminals 10 of one winding start and one winding end, the total number of coil terminals 10 is 48. The twenty-four winding start coil terminals 101 are disposed on the outer peripheral side of the connection plate 2, and the twenty-four winding start coil terminals 101 are connected to each other to form a neutral point N. The twenty-four winding end coil terminals 102 are divided into three phases (U phase, V phase, and W phase) by eight and are arranged at radially displaced positions on the inner circumferential side of the connection plate 2. The winding end coil terminals 102 of the same phase are drawn out to the same radius position. Eight U phase coils, eight V phase coils, and eight W phase coils are connected to form the three-phase concentrated winding stators 8.

In FIG. 2, the left side of the drawing is the inner diameter side of the concentrated winding coil 7, and the right side of the drawing is the outer diameter side.

FIG. 2(a) shows a state where the U phase is connected. A bobbin 6 is mounted on the core 5 having electromagnetic steel plates laminated thereon, and the concentrated winding coil 7 is wound around the bobbin 6. As shown in FIG. 3, the concentrated winding coil 7 is wound around the recess of the bobbin 6. In addition, the coil terminals 101 and 102 of an insulating coated conducting wire 1 of the concentrated winding coil 7 are inserted through the connection plate 2 and any one of the four connection rings 3 (3U (U phase), 3V (V phase), 3W (W phase), and 3N (neutral point)). Here, the four connection rings 3 are substantially circular with different diameters so that they can be arranged in an axial end portion (coil end portion) of the stator, and are arranged in one step on the same plane. Furthermore, the arrangement regions of the three connection rings 3U (U phase), 3V (V phase), and 3W (W phase) are substantially equal to the width of the bobbin 6, and the connection ring 3N at the neutral point (N) substantially coincides with the width of a yoke portion 5c of the core 5. Therefore, the four connection rings 3 (3U, 3V, 3W, and 3N) are arranged within the range of the radial width of the concentrated winding stator 8.

In FIG. 2(a), the winding start coil terminal 101 is connected to the connection ring 3N on the outermost periphery arranged on the connection plate 2, and forms the neutral point N. The winding end coil terminal 102 is connected to the second connection ring 3U from the innermost circumferential side arranged on the connection plate 2 to form the U phase. Although not shown at the neutral point N, at a position where the coil terminal 10 is inserted through both the U phase and the neutral point N, the through holes 20 are formed in the connection plate 2, and a connection hole 30 is opened in the connection ring 3. With this structure, inter-phase insulation between the insulating coated conducting wire 1 and the connection ring 3 of the concentrated winding coil 7 is maintained with the connection plate 2 interposed therebetween. In addition, the connection plate 2 is provided with a ring-shaped wall 21 to position the respective connection rings 3 and ensure phase-to-phase insulation between the connection rings 3.

FIG. 2(b) shows a state where the V phase is connected. The winding end coil terminal 102 is connected to the innermost circumferential side connection ring 3V arranged on the connection plate 2 to form the V phase. Other than that, the V phase has the same configuration as U phase.

FIG. 2(c) shows a state where the W phase is connected. The winding end coil terminal 102 is connected to the third connection ring 3W from the innermost circumferential side arranged on the connection plate 2 to form the W phase. Other than that, the W phase has the same configuration as U phase.

In the following description, a position in a radial direction around the rotation axis of the rotor 9 is simply referred to as a radial position or a radial position. Furthermore, in the following description, an outer diameter side along the radial direction around the rotation axis of the rotor 9 is simply referred to as an outer diameter side, and an inner diameter side along the radial direction around the rotation axis of the rotor 9 is simply referred to as an inner diameter side.

In the present embodiment, the winding end of each coil differs in phase in the radial direction. As shown in FIG. 2(a), the winding end position of the U phase coil is a fourth turn from the outer diameter side. As shown in FIG. 2(b), the winding end position of the V phase coil is the innermost diameter side. As shown in FIG. 2(c), the winding end position of the W phase coil is a second turn from the outer diameter side. In any of the concentrated winding coils 7, the wire diameter and the winding number of the insulating coated conducting wire 1 are equal.

As described above, in the present embodiment, by changing the position of the winding end of each coil depending on the phase while making the wire diameter and the number of windings of the insulating coated conducting wire 1 equal in each phase, the winding end is placed in the vicinity of the connection ring 3 of each phase. That is, in the present embodiment, the winding end position of each coil is disposed closest to the corresponding connection ring 3 among the plurality of connection rings 3. As a result, the length of the lead wire from the winding end to the connection ring 3 can be shortened, so that it is possible to prevent the lead wire, that is, the coil terminal 10 from breaking due to vibration or the like.

In the present embodiment, since the position in the radial direction of the winding end coil terminal is changed depending on the phase while making the wire diameter and the number of windings of the insulating coated conducting wire 1 equal in each phase, as shown in FIG. 3, the winding pattern is changed depending on the phase.

The winding pattern shown as "uppermost stage fourth turn" in FIG. 3 is the winding pattern of the U phase concentrated winding coil 7 shown in FIG. 2(a). The winding pattern shown as "uppermost stage full turn" in FIG. 3 is the winding pattern of the V phase concentrated winding coil 7 shown in FIG. 2(b). The winding pattern shown as "uppermost stage second turn" in FIG. 3 is the winding pattern of the W phase concentrated winding coil 7 shown in FIG. 2(c).

As shown in FIGS. 2 and 3, in the V phase concentrated winding coil 7, in order to make the winding end position the innermost diameter side, the insulating coated conducting wire 1 is wound up to the innermost diameter side at the uppermost stage of the winding.

In the U phase concentrated winding coil 7, since the insulating coated conducting wire 1 is wound by, for example, four turns from the outer diameter side to the stage further above the step corresponding to the uppermost stage of the V phase concentrated winding coil 7, the number of windings is reduced by, for example, four turns from the inner diameter side in the stage immediately below the step corresponding to the uppermost stage of the V phase concentrated winding coil 7.

Furthermore, in the W phase concentrated winding coil 7, since the insulating coated conducting wire 1 is wound by, for example, two turns from the outer diameter side to the stage further above the step corresponding to the uppermost stage of the V phase concentrated winding coil 7, the number of windings is reduced by, for example, two turns from the inner diameter side in the stage immediately below the step corresponding to the uppermost stage of the V phase concentrated winding coil 7.

In this way, in order to change the position in the radial direction of the winding end coil terminal depending on the phase while making the wire diameter and the winding number of the insulating coated conducting wire 1 equal in each phase, the number of winding patterns (the number of stages and the number of columns) may be different.

Second Embodiment

In the first embodiment described above, the position of the winding end coil terminal is changed by changing the number of turns of the uppermost stage of the coil on the outer diameter side; however, the position of the winding end coil terminal can also be changed by other methods.

Figure 4:
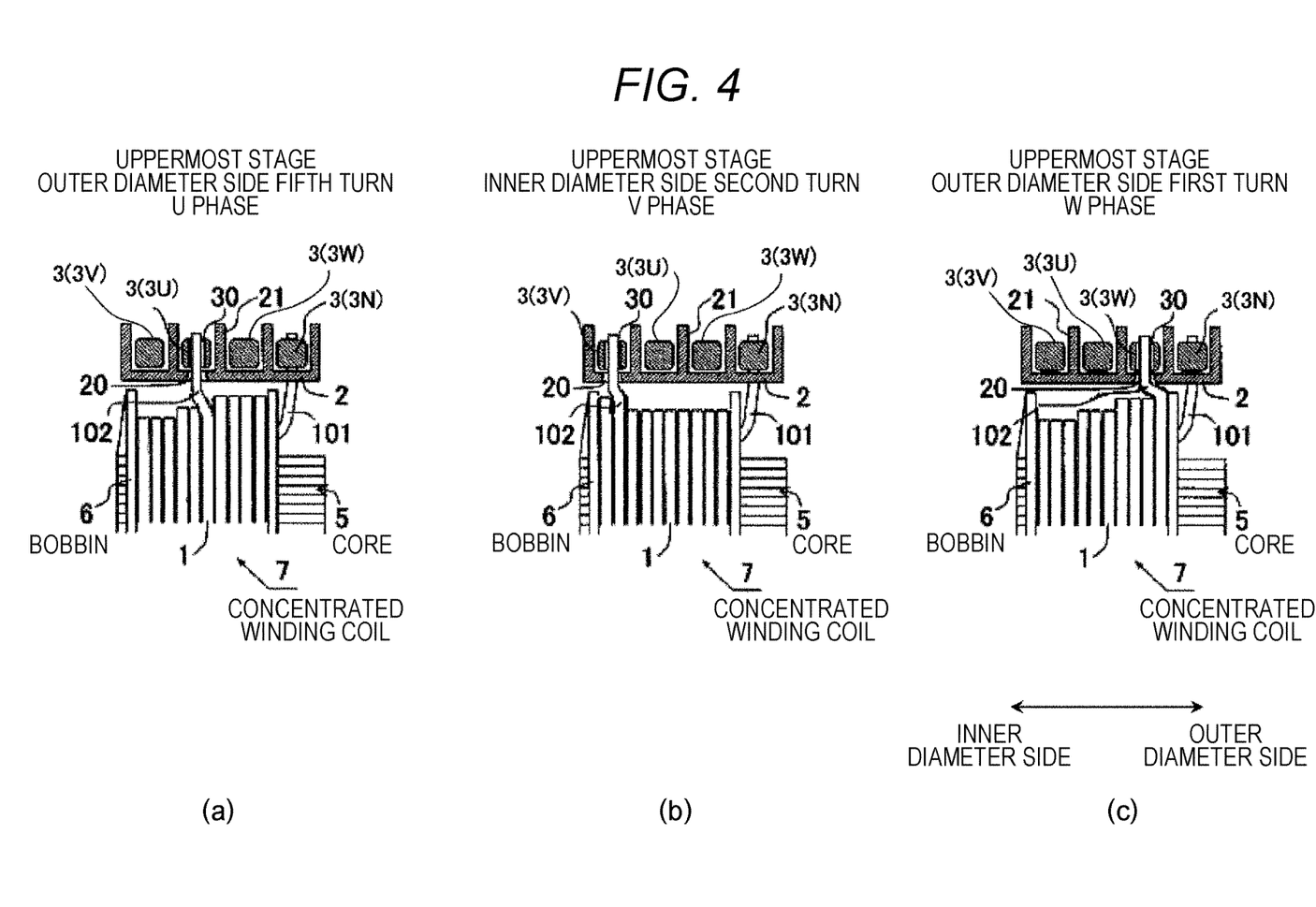
FIG. 4 is a cross-sectional view of a connection portion of a concentrated winding coil of a second embodiment, in which (a) shows a state where a U phase is connected, (b) shows a state where a V phase is connected, and (c) shows a state where a W phase is connected.

FIG. 4 is a cross-sectional view of a connection portion of a concentrated winding coil 7 of a second embodiment, in which FIG. 4(a) shows a state where a U phase is connected, FIG. 4(b) shows a state where a V phase is connected, and FIG. 4(c) shows a state where a W phase is connected.

As shown in FIG. 4, the winding end of each coil differs in the radial direction depending on the phase. As shown in FIG. 4(a), the winding end position of the U phase coil is a fifth turn from the outer diameter side. As shown in FIG. 4(b), the winding end position of the V phase coil is a second turn from the inner diameter side. As shown in FIG. 4(c), the winding end position of the W phase coil is a first turn from the outer diameter side.

Figure 5:
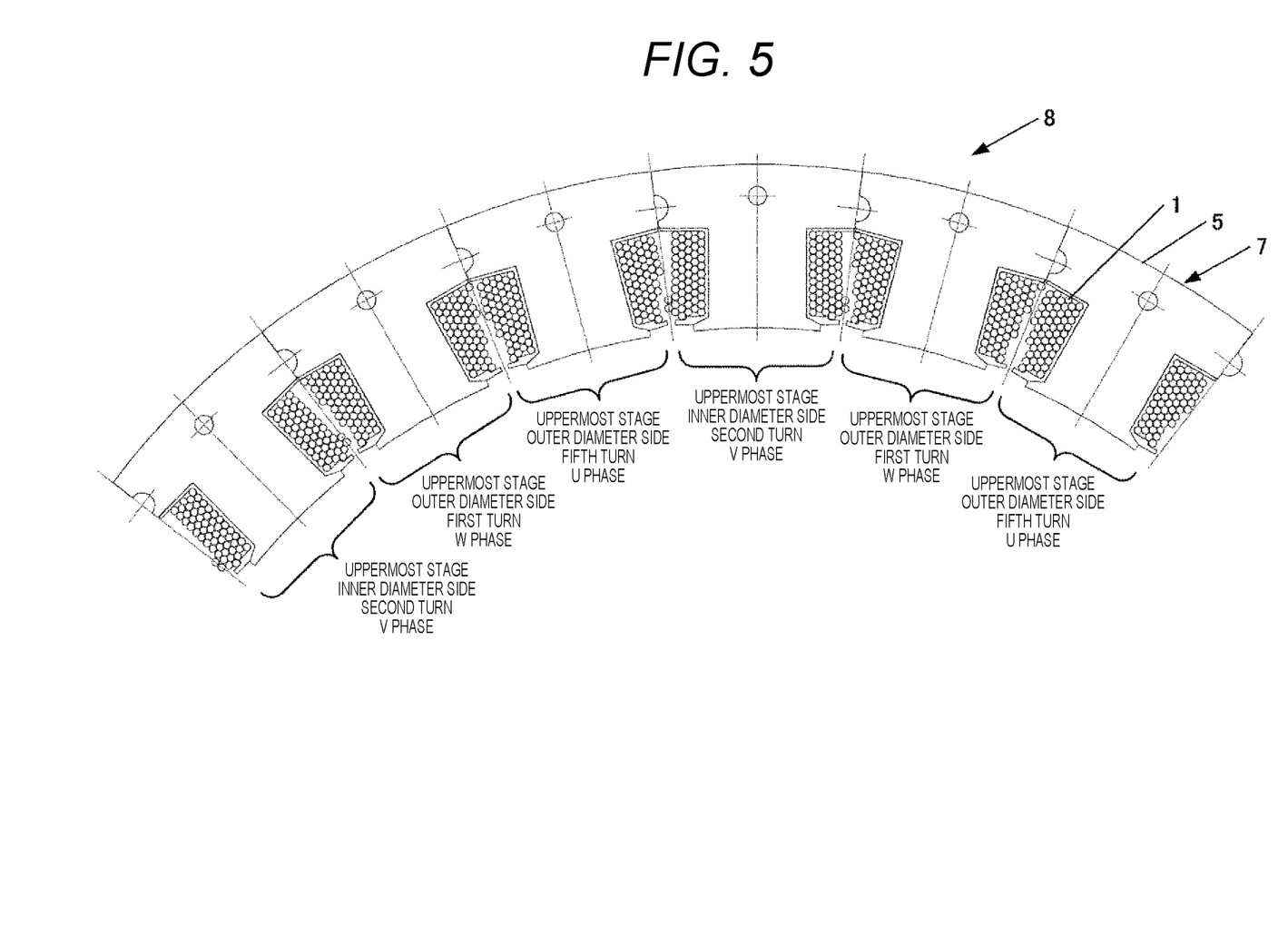
FIG. 5 is a view showing a winding pattern of each phase of the concentrated winding coil of the second embodiment.

FIG. 5 is a view showing a winding pattern of each phase of the concentrated winding coil 7 of the second embodiment shown in FIG. 4. In the concentrated winding coil 7 of the second embodiment, for example, in the U phase and the W phase, the radial position of the winding end coil terminal is changed by appropriately changing the number of windings from the outer diameter side of the uppermost stage of the windings, and for example, in the V phase, the radial position of the winding end coil terminal is changed by appropriately setting the number of windings from the inner diameter side of the uppermost stage of the winding.

The winding pattern shown as "uppermost stage outer diameter side fifth turn" in FIG. 5 is the winding pattern of the U phase concentrated winding coil 7 shown in FIG. 4(a). The winding pattern shown as "uppermost stage inner diameter side second turn" in FIG. 5 is the winding pattern of the V phase concentrated winding coil 7 shown in FIG. 4(b). The winding pattern shown as "uppermost stage outer diameter side first turn" in FIG. 5 is the winding pattern of the W phase concentrated winding coil 7 shown in FIG. 4(c).

As shown in FIGS. 4 and 5, in the V phase concentrated winding coil 7 of the second embodiment, in the uppermost stage of the winding, the insulating coated conducting wire 1 is wound by, for example, two turns from the inner diameter side. In the U phase concentrated winding coil 7, the insulating coated conducting wire 1 is wound, for example, by five turns from the outer diameter side at the uppermost stage of the winding. That is, in the U phase concentrated winding coil 7, the number of turns in the uppermost stage is increased by, for example, three turns than the V phase. Therefore, in the U phase concentrated winding coil 7, in the stage one level below the uppermost stage, by decreasing the number of turns by, for example, three turns from the inner diameter side, the number of turns in the U phase is made equal to the number of turns in the V phase.

Further, in the W phase concentrated winding coil 7, the insulating coated conducting wire 1 is wound by, for example, one turn from the outer diameter side to the step further above the step corresponding to the uppermost stage of the U phase concentrated winding coil 7. Therefore, in the W phase concentrated winding coil 7, in the stage corresponding to the uppermost stage of the U phase concentrated winding coil 7, by decreasing the number of windings, for example, by one turn from the inner diameter side, the number of turns in W phase is made equal to the number of turns in V phase and U phase.

As in this second embodiment, in the uppermost stage of the winding, the radial position of the winding end coil terminal may be changed by appropriately setting the number of windings from the outer diameter side, and the radial position of the winding end coil terminal may be changed by appropriately setting the number of windings from the inner diameter side. As a result, the winding end can be arranged in the vicinity of the connection ring 3 of each phase; therefore, the length of the lead wire from the winding end to the connection ring 3 can be shortened, and it is possible to prevent the lead wire, that is, the coil terminal 10 from breaking due to vibration or the like.

Figure 6:
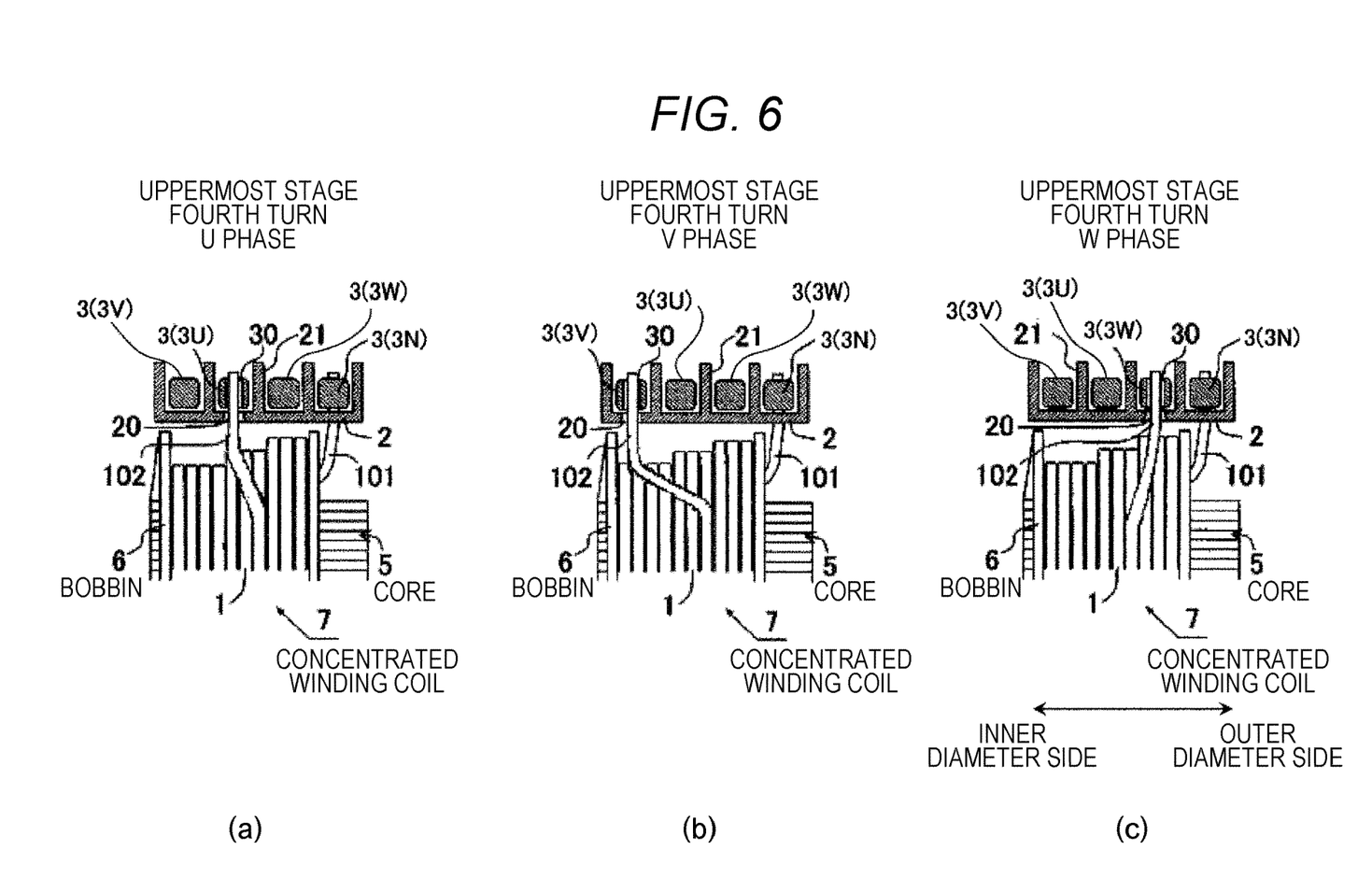
FIG. 6 is a cross-sectional view of a connection portion of a concentrated winding coil of a conventional example, in which (a) shows a state where a U phase is connected, (b) shows a state where a V phase is connected, and (c) shows a state where a W phase is connected.
Figure 7:
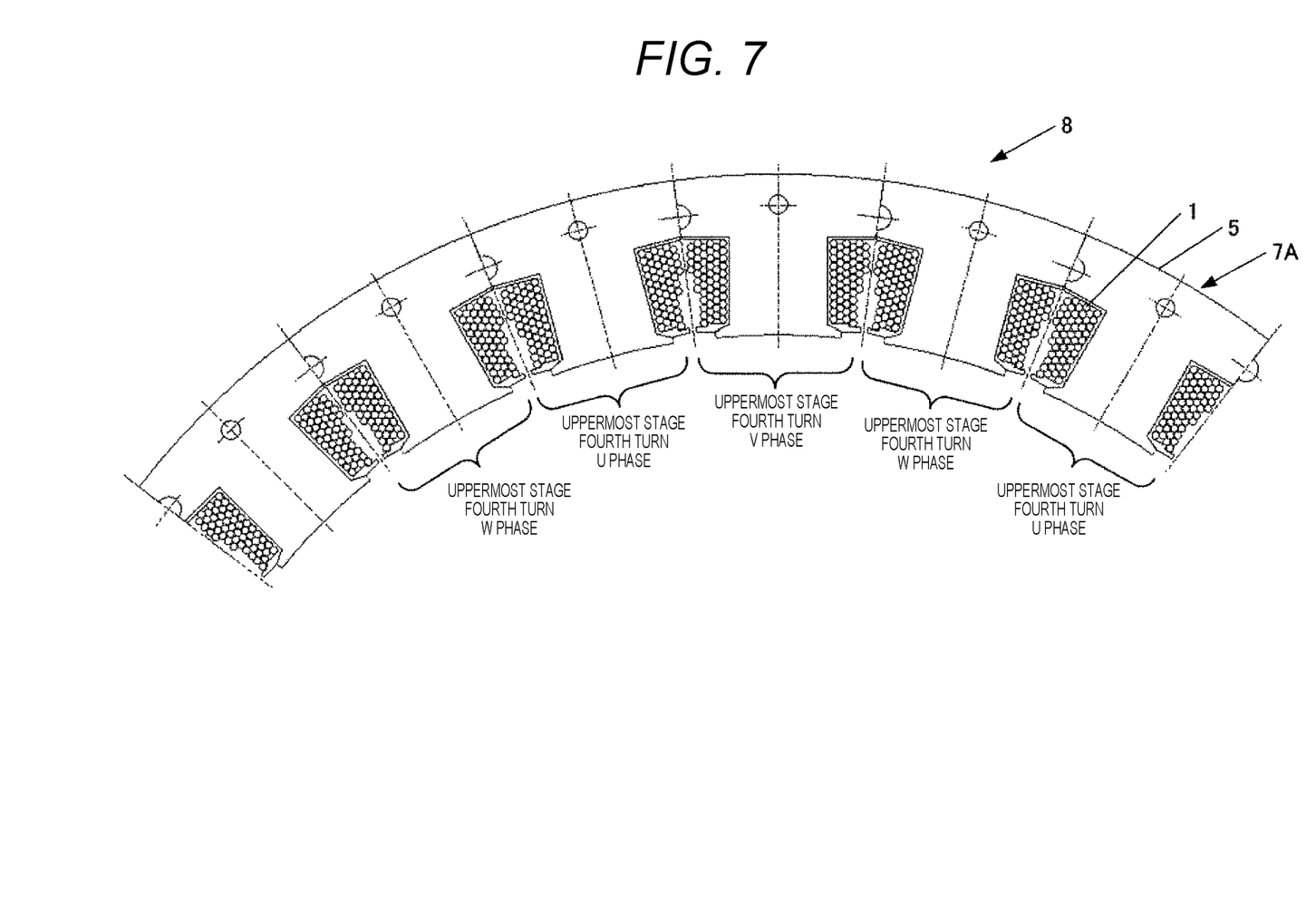
FIG. 7 is a view showing a winding pattern of each phase of the concentrated winding coil of the conventional example.

Conventional examples of the concentrated winding coil 7 will be described with reference to FIGS. 6 and 7 in order to explain the effect of the present invention easily. FIG. 6 is a cross-sectional view of a connection portion of a concentrated winding coil 7A of a conventional example, in which FIG. 6(a) shows a state where a U phase is connected, FIG. 6(b) shows a state where a V phase is connected, and FIG. 6(c) shows a state where a W phase is connected. FIG. 7 is a view showing a winding pattern of each phase in the conventional example. In the concentrated winding coil 7A of the conventional example, the position in the radial direction of the winding end coil terminal is the same position in each phase, and the winding pattern is the same in each phase.

In FIG. 6, since there is only one position in the radial direction of the coil terminal, for example, the wiring from the winding end to a connection ring 3V in the V phase shown in FIG. 6(*b*), that is, the lead wire is longer than the U phase and the W phase. Therefore, the coil terminal 10 in the V phase may be broken due to vibration or the like.

As is clear from FIG. 7, when there is only one type of winding pattern, there are places where the gap between adjacent coils becomes narrower or wider. Therefore, although a coil space factor in the stator slot in the case of one kind of winding pattern is higher than that in the distributed winding, the coil space factor is lower than that in the case of a plurality of winding patterns.

Figure 8:
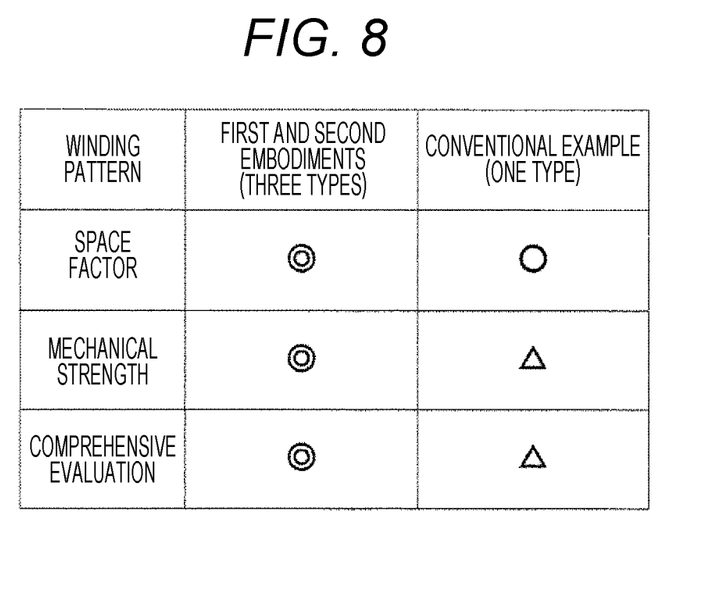
FIG. 8 is a comparative view of the concentrated winding coils of the first and second embodiments and the conventional concentrated winding coils.

FIG. 8 shows a comparative view of the concentrated winding coils 7 of the above described first and second embodiments and the conventional concentrated winding coils 7A.

In the concentrated winding coil 7A of the conventional example, although a coil space factor in the stator slot is higher than that in the distributed winding, the coil space factor is lower than that in the case of a plurality of winding patterns. Further, in the concentrated winding coil 7A of the conventional example, as described above, the length of the lead wire becomes long depending on the phase, and the mechanical strength of the lead wire may decrease. On the other hand, in the concentrated winding coil 7 of the first and second embodiments in which there are three winding patterns, the coil space factor can be increased and the mechanical strength of the lead wire can also be increased; therefore, the concentrated winding coil 7 is superior to the concentrated winding coil 7A of the conventional example.

Figure 9:
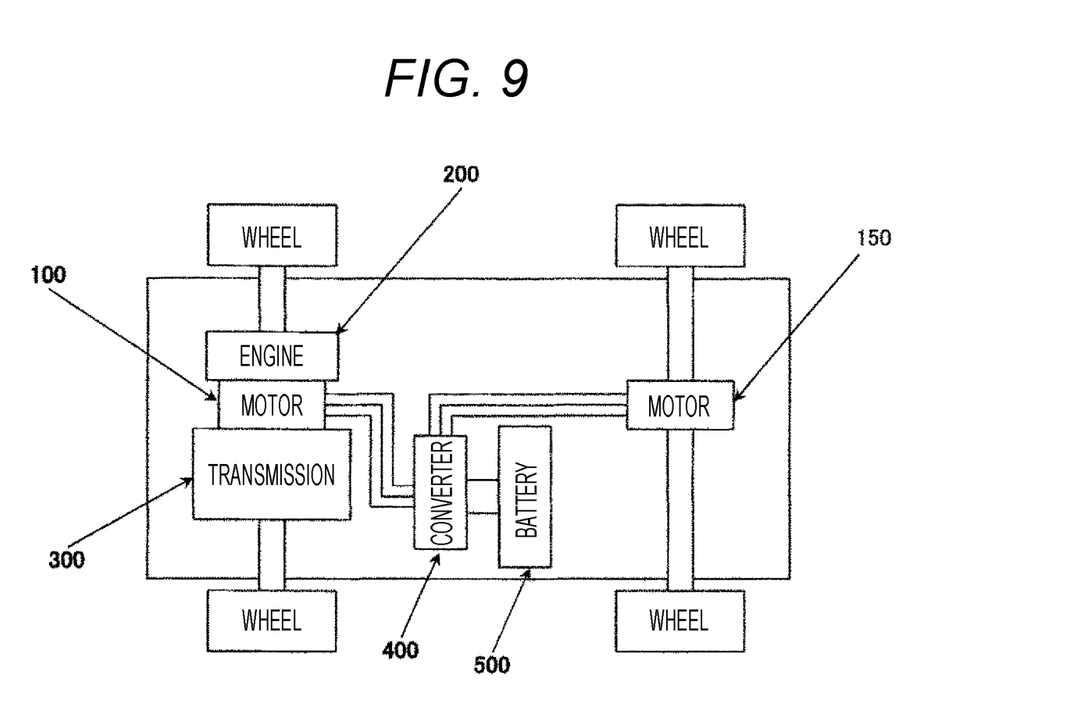
FIG. 9 is a diagram showing a configuration of a vehicle on which a rotating electric machine is mounted.

With reference to FIG. 9, a configuration of a vehicle on which the rotating electric machine 100 according to the present embodiment is mounted will be described. FIG. 9 is a diagram showing a configuration of a vehicle on which the above-described rotating electric machine 100 is mounted, and shows a power train of a four-wheel drive hybrid vehicle. This vehicle has an engine 200 and a rotating electric machine 100 as main power on a front wheel side. The power generated by the engine 200 and the rotating electric machine 100 is shifted by a transmission 300 and transmitted to the wheels (front wheel side driving wheels). In driving rear wheels, a rotating electric machine 150 disposed on a rear wheel side is mechanically connected to the wheels (a rear wheel side driving wheel), and the power generated by the rotating electric machine 150 is transmitted to the rear wheel side driving wheel.

The rotating electric machine 100 starts the engine 200 and switches the generation of the driving force and the generation of the generating power for recovering the energy at the deceleration of the vehicle as electric energy according to the running state of the vehicle. The driving and generating operations of the rotating electric machine 100 are controlled by an electric power converter 400 so as to optimize the torque and the rotational speed according to the driving situation of the vehicle. The electric power necessary for driving the rotating electric machine 100 is supplied from a battery 500 via the electric power converter 400. In addition, when the rotating electric machine 100 is in the power generating operation, electric energy is charged in the battery 500 via the electric power converter 400.

Here, the rotating electric machine 100, which is a power source on the front wheel side, is disposed between the engine 200 and the transmission 300, and has the above-described configuration. As the rotating electric machine 150 which is the driving force source on the rear wheel side, a rotating electric machine similar to the rotating electric machine 100 described above can be used, or another rotating electric machine of a general configuration can be used. Note that it is also applicable to a hybrid system other than a four-wheel drive type.

As described above, according to the present invention, it is possible to provide a stator for a rotating electric machine excellent in mechanical strength while maintaining the small and high efficiency characteristics of salient pole concentrated winding.

According to the above-described embodiment, the following action and effect are achieved.

(1) The concentrated winding stator 8 includes multi-phase concentrated winding coils 7 each having a salient pole concentrated winding, a plurality of cores 5 having a split core structure formed with a plurality of teeth 5a around which the multi-phase concentrated winding coils 7 are wound, and a plurality of connection rings 3 connecting each of the multi-phase concentrated winding coils 7. The winding end position of each of the multi-phase concentrated winding coils 7 is disposed closest to the corresponding connection ring 3 among the plurality of connection rings 3.

As a result, the length of the lead wire from the winding end to the connection ring 3 can be shortened, so that it is possible to prevent the lead wire, that is, the coil terminal 10 from breaking due to vibration or the like. Therefore, durability and reliability of the concentrated winding stator 8 can be improved, and the durability and reliability of the rotating electric machine 100 including the concentrated winding stator 8 can be improved.

(2) The concentrated winding stator 8 includes multi-phase concentrated winding coils 7 each having a salient pole concentrated winding, a plurality of cores 5 having a split core structure formed with a plurality of teeth 5a around which the multi-phase concentrated winding coils 7 are wound, and a plurality of connection rings 3 connecting each of the multi-phase concentrated winding coils 7. Each of the plurality of connection rings 3 has a different diameter. The winding end position of each of the multi-phase concentrated winding coils 7 exists at three different positions in the radial direction.

As a result, the length of the lead wire from the winding end to the connection ring 3 can be shortened, so that it is possible to prevent the lead wire, that is, the coil terminal 10 from breaking due to vibration or the like. Therefore, durability and reliability of the concentrated winding stator 8 can be improved, and the durability and reliability of the rotating electric machine 100 including the concentrated winding stator 8 can be improved.

(3) In each of the concentrated winding coils 7, the winding end position is made different by changing the number of winding stages and/or the number of rows for each phase. As a result, the number of windings of the insulating coated conducting wire 1 can be made equal for each phase, and the amount of generation of the rotating magnetic field in each phase of the concentrated winding coil 7 can be made equal, so that the operation of the rotating electric machine 100 can be stabilized.

It should be noted that the present invention is not limited to the above-described embodiments, but includes various modifications. For example, in FIG. 2 to FIG. 5, concentrated winding has been described, but also includes the case of a rotating electric machine having the same problem as concentrated winding. Although it is the main technology of the present invention to shorten the wiring distance to the connection ring 3 and to improve the mechanical strength, the present invention does not exclude the wiring method other than the connection ring 3. For example, the above-described embodiments have been described in detail for easy understanding of the present invention, and are not necessarily limited to those having all the configurations described. In addition, a part of the configuration of one embodiment can be replaced by the configuration of another embodiment, and the configuration of another embodiment can be added to the configuration of one embodiment. Further, it is possible to add, delete, and replace other configurations with respect to part of the configuration of each embodiment.

Figure 10:
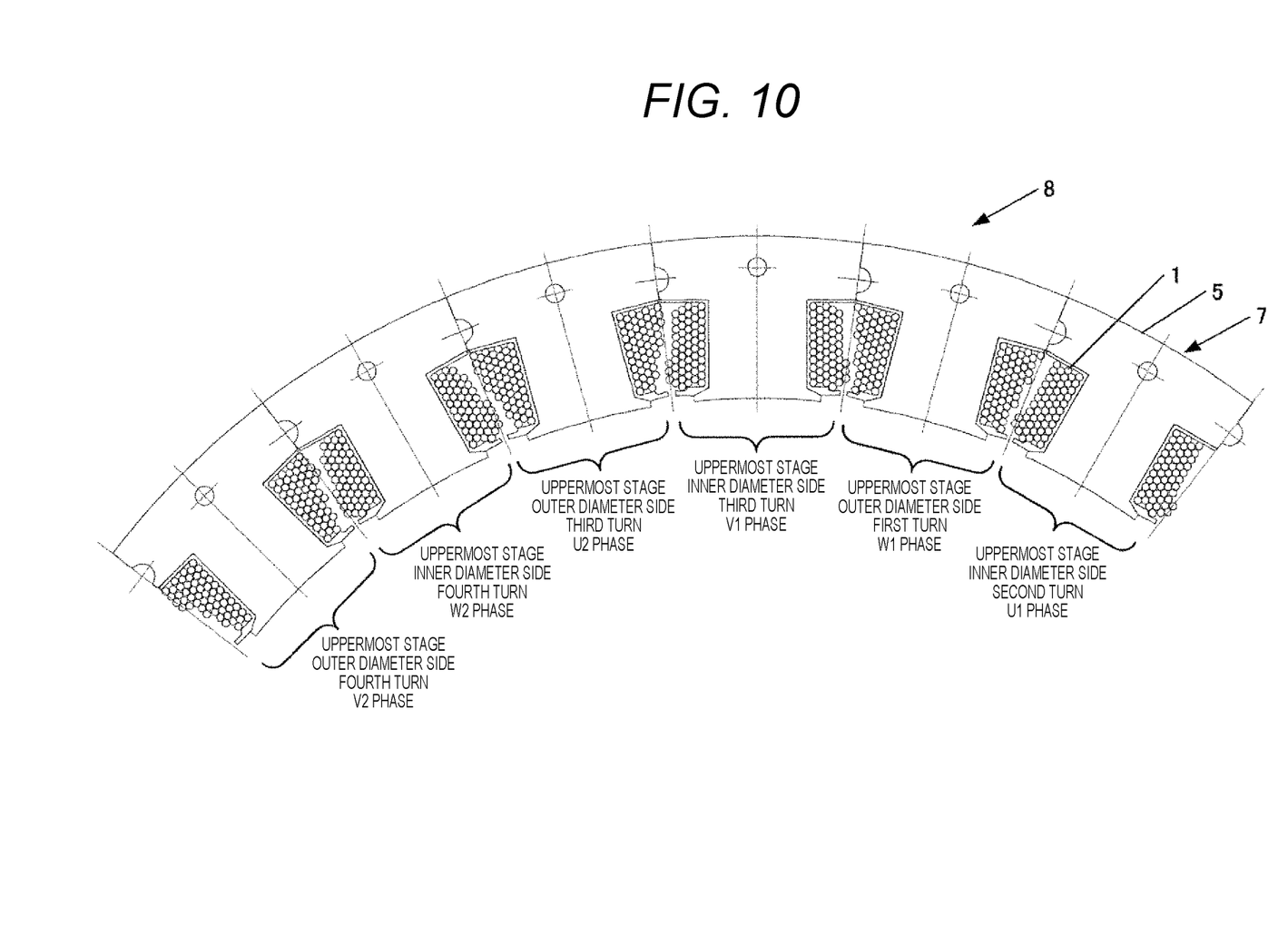
FIG. 10 is a view showing a modification.

Although the number of energized phases is three phases, the present invention can also be applied to a larger number of phases (for example, six phases) than three phases. The present invention can also be applied to 6-wire, three phase in the recent invention. FIG. 10 shows the winding pattern when the radial position of the winding end coil terminal is six. Even when the future phase number increases to 9 or 12 phases, the radial position of the coil terminal can be set to 9 positions and 12 positions, respectively, in the same way of thinking.

In the above description, the connection method is described using star connection; however, even in the case of delta connection, the connection ring 3N for neutral point connection disappears, but the present invention can be applied. It should be noted that the present invention can also be applied to the case where the radial position of the winding start coil terminal is different.

In the above description, it is a prerequisite that the number of turns of the insulating coated conducting wire 1 is equal in each phase; however, it does not exclude the difference in the number of turns within ±1 turn caused by the winding pattern and the step pattern of the coil. Similarly, it is a prerequisite that the wire diameter of the insulating coated conducting wire 1 of each coil is equal (the vertical length and the horizontal length of the wire in the case of a square wire or the like); however, it does not exclude the difference due to the tolerance of the copper wire and the elongation of the wire due to the tension of the winding machine at the time of winding. Furthermore, by deforming the copper wire, a configuration in which a round wire or a square wire is mixed in one coil is not excluded.

In the above description, the permanent magnet type rotating electric machine has been explained, but the feature of the present invention is that the position of the winding end coil terminal is different; therefore, the rotor is not a permanent magnet type, but it can also be applied to an induction type, a synchronous reluctance, a claw pole type and the like. Next, the inner rotation type is explained, but it is also applicable to an outer rotation type, a linear motor, and an axial gap type.

REFERENCE SIGNS LIST

1 insulating coated conducting wire
3, 3N, 3U, 3V, 3W connection ring
5 core
7 concentrated winding coil
8 concentrated winding stator
9 rotor
10 coil terminal
100 rotating electric machine
101 winding start coil terminal (coil terminal)
102 winding end coil terminal (coil terminal)

The invention claimed is:
1. A stator comprising:
a plurality of multi-phase stator coils each having a salient pole concentrated winding;
a stator iron core formed with a plurality of teeth around which the multi-phase stator coils are wound;
a plurality of connection rings configured to connect to the multi-phase stator coils, the connection rings respectively corresponding to a plurality of phases; and
a connection plate that separates the multi-phase stator coils and the connection rings, wherein
each of the multi-phase stator coils comprises a plurality of windings, and a respective one of the plurality of windings terminates in a winding end position at which the respective one of the windings is connected to and contacts a coil terminal that passes through the connection plate to connect to a corresponding connection ring, and
the respective winding end position of the respective one of the plurality of windings of each of the multi-phase stator coils is disposed at a position on the stator iron core closest to the corresponding connection ring among the plurality of connection rings to which each respective one of the plurality of windings connects.

2. The stator according to claim 1, wherein
in each of the multi-phase stator coils, the winding end position is different due to the number of stages and/or the number of rows of windings for each phase.

3. The stator according to claim 1, wherein the multi-phase stator coils are U phase, V phase, and W phase stator coils, the plurality of phases include the U phase, the V phase, and the W phase, each of the plurality of connection rings has a different diameter, and winding end positions of the U phase, V phase, and W phase stator coils are different from each other in a radial direction relative to a corresponding end of each of the U phase, V phase, and W phase stator coils.

4. The stator according to claim 3, wherein the windings included in the U phase, V phase, and W phase stator coils are wires whose wire diameter is constant, or a square line whose longitudinal length and transverse length are equal.

5. The stator according to claim 1, wherein the multi-phase stator coils have the same number of turns of windings.

6. A rotating electric machine comprising:
the stator according to claim 1; and
a rotor arranged rotatably via a predetermined gap with respect to the stator iron core.

7. The stator according to claim 1, wherein
the respective one of the plurality of windings of each of the multi-phase stator coils further comprises a lead wire configured to connect the winding end position of the respective one of the plurality of windings to the corresponding connection ring, and
the wiring end position on the stator iron core is disposed so as to reduce a length of the lead wire to maintain a connection to the corresponding connection ring.

8. A stator comprising:
a plurality of multi-phase stator coils each having a salient pole concentrated winding;
a stator core formed with a plurality of teeth around which the multi-phase stator coils are wound; and
a plurality of connection rings configured to connect to the multi-phase stator coils, wherein
each of the multi-phase stator coils comprises a plurality of windings, and a respective one of the plurality of windings terminates in a winding end position at which the respective one of the windings is connected to and contacts a coil terminal that connects to a corresponding connection ring, and the winding end position of the respective one of the plurality of windings is disposed at a position on the stator iron core closest to the corresponding connection ring among the plurality of connection rings to which each respective one of the plurality of windings connects, at least two of the plurality of connection rings have a different diameter.

9. The stator according to claim 8, wherein the multi-phase stator coils have the same number of turns of windings.

10. A rotating electric machine comprising:
the stator according to claim 8; and
a rotor arranged rotatably via a predetermined gap with respect to the stator core.

11. The stator according to claim 8, wherein
the respective one of the plurality of windings of each of the multi-phase stator coils further comprises a lead wire configured to connect the winding end position of the respective one of the plurality of windings to the corresponding connection ring, and
the wiring end position on the stator iron core is disposed so as to reduce a length of the lead wire to maintain a connection to the corresponding connection ring.

* * * * *